3,113,933
PROCESS FOR PREPARING UNSATURATED POLYESTERS WHICH CONTAIN AN ENDO-METHYLENEPHTHALYL ALCOHOL AS A GLYCOL COMPONENT
Hubert Sauer, Hofheim, Taunus, and Elisabeth Kob, Letmathe, Westphalia, Germany, assignors to Rutgerswerke-Aktiengesellschaft, Frankfurt am Main, Germany
No Drawing. Filed Aug. 31, 1960, Ser. No. 53,025
Claims priority, application Germany Sept. 9, 1959
5 Claims. (Cl. 260—45.4)

This invention relates to unsaturated polyesters and has particular relation to a process for preparing unsaturated polyesters which contain an endomethylenephthalyl alcohol as a glycol component.

The introduction of endomethylene-tetrahydrophthalyl alcohol as a glycol component into unsaturated polyesters, has the effect in mixed polymerization of such polyesters with a monomeric vinyl compound, e.g. styrene, that under the influence of peroxide catalysts, also in thin layers, at free access of air, curing free from tackiness is obtained, as described in the co-pending U.S. patent application Ser. No. 637,869, now Patent No. 2,951,823, and in the British Patent 830,794. According to said application and patent, respectively, the polyester is prepared by esterifying endomethylenetetrahydrophthalyl alcohol with the acid component in conventional manner. The preparation of endomethylenetetrahydrophthalyl alcohol is disclosed in various papers. According to the German Patent No. 725,082, cyclopentadiene is taken up under pressure by butene-2-diol-1,4. In the process described in Chemische Berichte 87 (1954), pages 162–164/65, a selective reduction of endomethylenetetrahydrophthalic acid, or of its dimethylester with lithium-aluminum hydride to the corresponding alcohol is carried out. The preparation of this compound is troublesome in all cases.

It has now been discovered that polyesters which contain as a glycol component endomethylenetetrahydrophthalyl alcohol, can be prepared in simple manner without isolating this component in substance, by proceeding according to the present invention as follows.

2 mols of phthalic acid anhydride and 1 mol of butene-2-diol-1,4 are combined to form the acid di-phthalic acid glycol ester which is then reacted with cyclopentadiene. Thereby, practically quantitative addition of the cyclopentadiene to the double bond of the glycol takes place, without the use of superatmospheric pressure. The acid ester of the endomethylenetetrahydrophthalyl alcohol thus obtained, is now further condensed in conventional manner with maleic acid anhydride, or with the anhydride of another unsaturated dibasic carboxylic acid and the corresponding amount of a glycol. Thereby the use of the glycol in excess is preferred in order to obtain as complete esterification as possible.

This process has the advantage that it is not necessary to prepare in a separate step and to isolate the endomethylenetetrahydrophthalyl alcohol and that the otherwise observed formation of cyclic ethers in the esterification of butene-2-diol-1,4 with dicarboxylic acids is avoided.

In a similar manner, adducts of cyclopentadiene to glycols with triple bond, such as butine-2-diol-1,4 can be built in easily in polyesters.

Instead of cyclopentadiene, dicyclopentadiene can also be used if the addition is carried out at temperatures, at which splitting of the dimeric cyclopentadiene into the monomeric cyclopentadiene takes place. Furthermore, instead of cyclopentadiene, homologous compounds, such as methylcyclopentadiene or substituted cyclopentadienes, such as hexachlorocyclopentadiene, or mixtures of these compounds can be used.

The reaction of the unsaturated glycol can be carried out also with other anhydrides of dibasic acids, such as the anhydrides of tetrahydrophthalic acid, dimethyltetrahydrophthalic acid, or hexachloroendomethylenetetrahydrophthalic acid. Maleic acid anhydride may also be used, but it does not remain unchanged, because it reacts with cyclopentadiene to endomethylenetetrahydrophthalic acid.

The polyesters prepared according to the present invention can be used in conventional manner, after being mixed with a vinyl compound suitable for mixed polymerization, such as styrene, e.g. as lacquer resins, casting resins and laminating resins. Their curing or hardening is carried out in conventional manner by means of a peroxide catalyst, if desired in the presence of an accelerator.

The following examples illustrate some specific embodiments of and best modes for carrying out the invention, to which the invention is not limited.

*Example 1*

88 parts by weight of butene-2-diol-1,4 (1 mol) are mixed with 296 parts by weight of phthalic acid anhydride (2 mols) and slowly heated under stirring in the atmosphere of an inert gas to about 90° C. Thereby acid diphthalic acid glycol ester is formed in an exothermic reaction. The temperature is kept by cooling at about 100°–110° C. After completed reaction, at a temperature of about 110° C. during a period of about 60 minutes 66 parts by weight of cyclopentadiene (1 mol) are introduced under stirring into the reaction mass and an after-reaction at a temperature increased up to 150° C. is permitted to take place during a short period of time. Free cyclopentadiene is then practically not present any more. The reaction mass is then cooled to about 100° C. and 98 parts of maleic anhydride (1 mol) and 124 parts of ethylene glycol (2 mols) and a small amount of hydroquinone as inhibitor of polymerization are added. Esterification is carried out under stirring and introduction of the protective inert gas at slowly increased temperature, whereby about 55 parts of reaction water are distilled off. After esterification, e.g. when the acid number is about 30, the reaction mass is permitted to cool to about 100° C., is then mixed with 220 parts of styrene and the mixture is cooled to room temperature. 830 parts of polyester resin ready for use are thus obtained.

*Example 2*

In a manner analogous to that described in Example 1, 86 parts of butine-2-diol-1,4 and 296 parts of phthalic acid anhydride are reacted. The acid diphthalic acid glycol ester thus formed is reacted by addition reaction with 66 parts of cyclopentadiene at a temperature of about 100° C. The reaction product is mixed with 98 parts of maleic acid anhydride and 124 parts of ethylene glycol and esterified. After the addition of 250 parts of styrene, 860 parts of polyester resin ready for use are obtained. Details of the process not particularly mentioned in this example are carried out in a manner analogous to that described in Example 1.

*Example 3*

88 parts of butene-2-diol-1,4 are reacted with 296 parts of phthalic acid anhydride, in the manner described in the above Example 1. Into the reaction mixture, at a temperature of about 120° C. during a period of about 60 minutes, 80 parts of methylcyclopentadiene are introduced. After the addition reaction has taken place, 98 parts of maleic acid anhydride and 124 parts of ethylene glycol are added and the reaction components are esterified until an acid number of about 30 is reached. After the addition to the esterified product, of 220 parts of styrene, 840 parts of polyester resin ready for use are obtained.

*Example 4*

The reaction product prepared in accordance with the above Example 1 from 88 parts of butene-2-diol-1,4 and 296 parts of phthalic acid anhydride, is reacted with 273 parts of hexachlorocyclopentadiene. After the addition reaction has taken place, to the reaction mass 98 parts of maleic acid anhydride and 124 parts of ethylene glycol are added and esterification is carried out until an acid number of about 30 is reached. After the addition of 330 parts of styrene, 1150 parts of polyester resin ready for use are obtained.

The parts and percent mentioned herein are by weight if not otherwise mentioned.

It will be appreciated from the above that this invention is not limited to the specific materials, proportions, conditions and other details specifically described above and can be carried out with various modifications. Thus, as accelerators of curing e.g. cobalt-naphthenate can be used. The inert gas, in which the formation of the polyester is carried out, may be $N_2$ or $CO_2$. The short period of the after-reaction (mentioned in Example 1) up to 150° C. may amount to 10 to 15 minutes. The hydroquinone used as polymerization inhibitor, may be added in an proportion of 0.005 to 0.025%, based on the weight of the reaction mass. In carrying out esterification, while slowly raising the temperature, the latter may be increased e.g. up to 220° C. As further examples of copolymerizable vinyl compounds, in addition to styrene, vinyltoluene, methylmethacrylate are mentioned. Steps, conditions etc. in Examples 2-4, which are not specifically described in these examples are in general analogous with the corresponding specific details described in Example 1. As further examples of homologues or substitution products of cyclopentadiene, which can be used in the above described manner in carrying out the invention methylcyclopentadiene, hexachlorocyclopentadiene are mentioned. The excess, in which the second glycol is used in the above described esterification, amounts preferably to 10-20% of the amount of 2 mols. These and other modifications can be made without departing from the scope of the invention, as defined in the appended claims.

What is claimed is:

1. A process for preparing unsaturated polyesters which contain as glycol component an endomethylenephthalyl alcohol, comprising reacting an unsaturated glycol selected from the group consisting of butene-2-diol-1,4 and butine-2-diol-1,4 with phthalic acid anhydride in the molecular proportion of 1:2 to form the acid diphthalic acid glycol ester; reacting the latter by heating with a compound selected from the group consisting of cyclopentadiene, methylcyclopentadiene and hexachlorocyclopentadiene; and condensing by heating the resulting product with an unsaturated dicarboxylic acid and a glycol to form a polyester.

2. A process as claimed in claim 1, in which the unsaturated glycol is butene-2-diol-1,4.

3. A process as claimed in claim 1, in which the unsaturated glycol is butine-2-diol-1,4.

4. A process as claimed in claim 1, in which the resulting product is mixed with a co-polymerizable vinyl compound.

5. A process as claimed in claim 4, in which the vinyl compound is styrene.

References Cited in the file of this patent
UNITED STATES PATENTS

| | | |
|---|---|---|
| 2,863,795 | Robitschek et al. | Dec. 9, 1958 |
| 2,863,848 | Robitschek et al. | Dec. 9, 1958 |